US009624446B2

(12) United States Patent
Trewella et al.

(10) Patent No.: US 9,624,446 B2
(45) Date of Patent: Apr. 18, 2017

(54) LOW TEMPERATURE PROPERTY VALUE REDUCING COMPOSITIONS

(75) Inventors: Jeffrey C. Trewella, Kennett Square, PA (US); Vicente Sanchez, Houston, TX (US); Roger L. Leisenring, Jr., Downingtown, PA (US)

(73) Assignee: Inaeris Technologies, LLC, Pasadena, TX (US)

( * ) Notice: Subject to any disclaimer, the term of this patent is extended or adjusted under 35 U.S.C. 154(b) by 697 days.

(21) Appl. No.: 13/527,274

(22) Filed: Jun. 19, 2012

(65) Prior Publication Data

US 2013/0338409 A1  Dec. 19, 2013

(51) Int. Cl.
| | |
|---|---|
| C10L 1/00 | (2006.01) |
| C10L 1/02 | (2006.01) |
| C10G 3/00 | (2006.01) |
| C10L 1/04 | (2006.01) |
| C10G 1/06 | (2006.01) |
| C10G 1/08 | (2006.01) |

(52) U.S. Cl.
CPC ............... *C10L 1/02* (2013.01); *C10G 1/06* (2013.01); *C10G 1/08* (2013.01); *C10G 3/42* (2013.01); *C10G 3/50* (2013.01); *C10L 1/04* (2013.01); *C10G 2300/1011* (2013.01); *C10G 2300/1022* (2013.01); *C10G 2300/301* (2013.01); *C10G 2300/304* (2013.01); *Y02P 30/20* (2015.11)

(58) Field of Classification Search
CPC ..... C10L 2200/0461; C10L 2200/0469; C10L 2200/0484; C10G 2300/1011; C10G 2300/1014; C10G 2300/1037; C10G 2300/304
USPC ..................................................... 585/1, 240
See application file for complete search history.

(56) References Cited

U.S. PATENT DOCUMENTS

| | | | |
|---|---|---|---|
| 5,820,640 A | 10/1998 | Ikura et al. | |
| 7,279,018 B2 | 10/2007 | Jakkula et al. | |
| 7,638,314 B2 | 12/2009 | Zappi et al. | |
| 7,819,930 B2 | 10/2010 | Adams et al. | |
| 8,039,682 B2 * | 10/2011 | McCall ...................... | C10G 3/46 585/240 |
| 8,063,258 B2 * | 11/2011 | Bartek et al. ............... | 585/240 |
| 8,119,847 B2 | 2/2012 | Dindi et al. | |
| 8,143,469 B2 * | 3/2012 | Koivusalmi ........... | C10G 45/62 208/133 |
| 8,277,643 B2 | 10/2012 | Huber et al. | |
| 8,288,600 B2 * | 10/2012 | Bartek et al. .............. | 585/240 |
| 8,324,438 B2 * | 12/2012 | Brandvold et al. ......... | 585/240 |
| 8,329,967 B2 | 12/2012 | Brandvold et al. | |
| 8,329,968 B2 | 12/2012 | Brandvold et al. | |
| 8,329,969 B2 | 12/2012 | McCall et al. | |
| 8,350,103 B2 | 1/2013 | Roberts et al. | |
| 8,373,012 B2 * | 2/2013 | Peters ..................... | C10G 3/42 585/14 |
| 8,377,152 B2 | 2/2013 | Ramirez Corredores et al. | |
| 8,450,541 B2 * | 5/2013 | Seames et al. .............. | 585/240 |
| 8,454,712 B2 | 6/2013 | Ramirez Corredores et al. | |
| 8,471,079 B2 * | 6/2013 | Brandvold et al. .......... | 585/240 |
| 8,471,081 B2 * | 6/2013 | McCall ..................... | C07C 9/16 44/605 |
| 8,506,658 B2 | 8/2013 | Corredores et al. | |
| 8,546,635 B1 * | 10/2013 | Brandvold et al. .......... | 585/639 |
| 8,581,013 B2 * | 11/2013 | Abhari ..................... | C10G 3/50 123/1 A |
| 8,704,020 B2 * | 4/2014 | Roberts et al. .............. | 585/240 |
| 8,754,275 B2 | 6/2014 | Brandvold et al. | |
| 8,772,557 B2 | 7/2014 | Chen et al. | |
| 8,772,558 B2 | 7/2014 | Chen | |
| 8,927,795 B2 | 1/2015 | McCall et al. | |
| 2009/0000185 A1 | 1/2009 | Aulich et al. | |
| 2009/0166256 A1 | 7/2009 | Lewis et al. | |
| 2009/0234030 A1 | 9/2009 | Gouman | |
| 2009/0250376 A1 | 10/2009 | Brandvold et al. | |
| 2009/0253948 A1 | 10/2009 | McCall et al. | |
| 2009/0301930 A1 | 12/2009 | Brandvold et al. | |
| 2010/0064574 A1 | 3/2010 | de Almeida et al. | |
| 2010/0145117 A1 * | 6/2010 | Seames ..................... | C10G 3/00 585/240 |
| 2010/0312028 A1 * | 12/2010 | Olson ....................... | C10L 1/08 585/242 |
| 2011/0126449 A1 | 6/2011 | Xu et al. | |
| 2011/0138681 A1 | 6/2011 | Ramirez Corredores et al. | |
| 2011/0155631 A1 | 6/2011 | Knuuttila et al. | |
| 2011/0259793 A1 | 10/2011 | Umansky et al. | |
| 2011/0282118 A1 | 11/2011 | Shih | |

(Continued)

FOREIGN PATENT DOCUMENTS

| | | |
|---|---|---|
| GB | 2399571 A | 9/2004 |
| WO | 2009014859 A1 | 1/2009 |

(Continued)

OTHER PUBLICATIONS

Richard Bain, "Biodiesel and Other Renewable Diesel Fuels", publication, National Renewable Energy Laboratory, Nov. 2006.
Math Rop, "An Introduction to Petroleum Refining and the Production of Ultra Low Sulfur Gasoline and Diesel Fuel", publication, Mathrpo, Inc. 2011.
Roger Leisenring, "Starndard Specification for Diesel Fuel Oils", publication, ASTM International, Pennsylvania, Jan. 2012.
"HM 40 Guidelines for the Crude Oil Washing of Ships' Tanks and the Heating of Crude Oil Being Transported by Sea", publication, Energy Institute, London, Jun. 2004.
Zhang Qi, Chang Jie, Wang Tiejun, Xu Ying, "Review of Biomass Pyrolysis Oil Properties and Upgrading Research", Energy Conversion and Management, p. 87-92, vol. 48, Guangzhou Institute of Energy Conversion, China 2007.

(Continued)

*Primary Examiner* — Ellen McAvoy
(74) *Attorney, Agent, or Firm* — John Wilson Jones; Jones Delflache LLP

(57) ABSTRACT

Disclosed is a renewable composition derived from the conversion of biomass at an elevated temperature, with conversion optionally in the presence of a catalyst, which is capable of reducing, and thereby improving, a low temperature property of a distillate. A process is also disclosed for mixing such renewable composition with the distillate.

48 Claims, No Drawings

(56) References Cited

U.S. PATENT DOCUMENTS

| | | |
|---|---|---|
| 2012/0005949 A1 | 1/2012 | Stevens et al. |
| 2012/0077234 A1* | 3/2012 | Hazlebeck ............... C10G 3/00 435/134 |
| 2012/0101318 A1 | 4/2012 | Ramirez Corredores et al. |
| 2012/0152801 A1 | 6/2012 | Bozzano et al. |
| 2012/0172643 A1 | 7/2012 | Ramirez Corredores et al. |
| 2012/0216448 A1 | 8/2012 | Ramirez Corredores et al. |
| 2012/0266838 A1* | 10/2012 | Gosselink et al. ............ 123/1 A |
| 2012/0283493 A1* | 11/2012 | Olson ....................... C10L 1/08 585/242 |
| 2012/0289752 A1* | 11/2012 | Gosselink et al. ................ 585/1 |
| 2012/0304530 A1 | 12/2012 | Chitta et al. |
| 2013/0174476 A1 | 7/2013 | Ramirez Corredores et al. |
| 2013/0305591 A1* | 11/2013 | McCall et al. .................. 44/300 |
| 2013/0333652 A1 | 12/2013 | Trewella et al. |
| 2014/0288338 A1 | 9/2014 | Radlein et al. |

FOREIGN PATENT DOCUMENTS

| | | |
|---|---|---|
| WO | 2009082366 A1 | 7/2009 |
| WO | 2009126508 A1 | 10/2009 |
| WO | 2010002886 A1 | 1/2010 |
| WO | 2010135734 A | 11/2010 |
| WO | WO2010/135734 | 11/2010 |
| WO | 2011143396 A1 | 11/2011 |
| WO | WO2011/143396 | 11/2011 |

OTHER PUBLICATIONS

Vicente Sanchez, Leslie May, John Kasbaum, Dan Strope, Jeffrey Trewella, Properties of Gasoline and Biofuels Containing Renewable Drop-In Biofuel Blend Stocks Prepared by the Thermo-Catalytic Conversion of Lignocellulose, 2012 IASH Conference Presentation, KiOR, Inc. and Petro Tech Consultants LLC, Texas 2012.

Vicente Sanchez, Ramon Bonaquest Jeffrey Trewella, "Renewable Fuel Bi-products Potential Use in Asphalt", 2012 AAPT Annual Meeting Presentation, KiOR Inc., Texas 2012.

M. Garcia-Perez, J. Shen, X.S. Wan, C.F. Li, "Production and Fuel Properties of Fast Pyrolysis Oi/Bio-Diesel Blends", Fuel Processing Technology 91 (3), p. 296-305, 2010.

U.S. Appl. No. 13/964,873, filed Aug. 12, 2013; inventor: Ramirez Corrdores et al.

* cited by examiner

LOW TEMPERATURE PROPERTY VALUE REDUCING COMPOSITIONS

1. FIELD OF THE INVENTION

The present invention relates generally to a composition capable of reducing a low temperature property of a distillate, and a process for blending such composition with the distillate. The present invention also relates to a bio-distillate composition having at least 40 wt % cycloparaffins.

2. DESCRIPTION OF THE RELATED ART

Distillate fuels are refined and produced such that their low temperature properties are suitable for the area and season in which they are used. For instance, when the temperature drops below the cloud point of the distillate fuel, operating difficulties may appear due to wax crystal dropout. Such operating difficulties can include the plugging of fuel filters and fuel lines. In the case of jet fuel distillate fuels, fuel filter plugging can lead to an interruption of fuel flow to the turbine engines which can have catastrophic consequences. The low temperature property of a distillate fuel can be reduced to some extent by adding a product with a lower wax content, such as a low wax heating oil or kerosene, or by using cold flow improver additives, which can be expensive depending on the required level of low temperature property suppression. In addition to petroleum distillates, some bio-distillates and some distillates, including jet fuels produced by a Fischer-Tropsch process can also have low temperature property issues.

Also, with the rising costs and environmental concerns associated with fossil fuels, renewable energy sources have become increasingly important, and in particular, the production of renewable transportation fuels from the conversion of biomass feedstocks for use as fuels or for blending with petroleum fuels. However, as stated above, some renewable fuels such as some bio-distillates and some Fischer-Tropsch hydrocarbons are themselves in need of an additive or admixture of some kind to reduce/suppress their low temperature properties and thereby extend their useful operating range to lower temperatures.

Accordingly, there remains a need for a composition produced from a renewable source, and process of using such, which is capable of reducing low temperature properties of distillates.

SUMMARY OF THE INVENTION

In accordance with an embodiment of the present invention, a distillate mixture is provided and comprises:
a) a first component selected from the group consisting of: a petroleum distillate, distillate range hydrocarbons produced by a Fischer-Tropsch process, and mixtures thereof, the first component having a low temperature property value; and
b) a second component comprising an at least partially hydrotreated bio-distillate fraction produced from the conversion of biomass at an elevated temperature; wherein the distillate mixture has a low temperature property value which is lowered as compared to the low temperature property value of the first component.

In accordance with another embodiment of the present invention, a bio-distillate composition is provided which boils in the range of from about 320 to about 700° F. and comprises: a) at least about 40 wt % cycloparaffins, and b) less than about 5 wt % n-paraffins and iso-paraffins; wherein the bio-distillate composition has been at least partially hydrotreated.

In accordance with another embodiment of the present invention, a low temperature property value reducing composition is provided comprising a bio-distillate fraction produced from the thermo-catalytic conversion of a biomass, wherein the bio-distillate fraction has been at least partially hydrotreated; and wherein the low temperature property value reducing composition is capable of reducing a low temperature property value of a distillate component selected from the group consisting of: a petroleum distillate, distillate range hydrocarbons produced by a Fischer-Tropsch process, and mixtures thereof.

DETAILED DESCRIPTION OF THE INVENTION

The biomass material useful in the current invention can be any biomass capable of being converted to liquid and gaseous hydrocarbons.

Solid biomass materials comprising a cellulosic material, in particular lignocellulosic materials, are useful because of the abundant availability of such materials, and their low cost. The solid biomass feed can comprise components selected from the group consisting of lignin, cellulose, hemicelluloses, and combinations thereof. Examples of suitable solid biomass materials include plantation wood crops such as Southern Yellow Pine, forestry wastes, such as wood chips and saw dust; agricultural waste, such as straw, corn stover, sugar cane bagasse, municipal waste, in particular yard waste, paper, and card board; energy crops such as switch grass, coppice, eucalyptus, giant miscanthus; and aquatic materials such as algae; and the like.

The biomass can be converted at elevated temperatures to form a conversion reactor effluent. In particular, the biomass can be converted in a conversion reactor containing a heat carrier material to thereby produce the conversion reactor effluent comprising vapor conversion products and heat carrier material. The conversion reactor effluent can also include unreacted biomass, coke, or char. The vapor conversion products comprise, consist of, or consist essentially of non-condensable gases including CO and $CO_2$, bio-oil, and water. The conversion reactor can be operated at a temperature in the range of from about 200° C. to about 1000° C., or between about 250° C. and about 800° C., and can be operated in the substantial absence of oxygen. At least a portion of the heat carrier can be a catalyst.

Such catalyst can be any catalyst capable of converting biomass to a bio-oil product having relatively low oxygen levels. The oxygen levels of such bio-oil can be less than about 20 wt % on a dry basis.

More particularly, useful catalysts for the current invention include those containing catalytic acidity and can contain a zeolite. Examples of suitable zeolites include ZSM-5, ZSM-11, ZSM-22, ZSM-23, ZSM-48, mordenite, beta, ferrierite, and zeolite-Y. Additionally, the catalyst may comprise a super acid, including sulfonated, phosphated, or fluorinated forms of zirconia, titania, alumina, silica-alumina, or clays, pillared layered clays and/or silicotitanates or pillared layered silicotitanates. In another embodiment, the catalyst may comprise a solid base including metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

At least a portion of the vapor conversion products, from either or both of a catalytic or non-catalytic conversion process as described above, can be separated from the conversion reactor effluent, and at least a portion of the vapor conversion products thus separated can be condensed to form a condensate comprising bio-oil and water.

When the heat carrier does not include a catalyst component, the condensate can first be at least partially hydrotreated in order to make the resulting hydrotreated condensate more susceptible to separation. At least a portion of the bio-oil can then be separated from the hydrotreated condensate, also forming an aqueous phase.

When the heat carrier includes the catalyst as described above, at least a portion of the bio-oil can be separated from the condensate, without the necessity of prior hydrotreatment, also forming an aqueous phase.

In either case, such separation can be by any method capable of separating bio-oil from an aqueous phase, and can include, but is not limited to, centrifugation, membrane separation, gravity separation, and the like. In a specific embodiment, the condensate is separated by gravity separation in a settling vessel into the bio-oil and into the aqueous phase.

An at least partially hydrotreated bio-distillate fraction produced from the bio-oil can be used as a part of a distillate mixture, as described below. The term "at least partially hydrotreated" as used herein includes the removal of at least 80, or at least 90, or at least 95, or at least 99, or at least 100% of the oxygen contained in carbon-hydrogen-oxygen containing compounds, from whatever source, which are subjected to hydrotreatment. Further, products which are at least partially hydrotreated as described herein can comprise less than about 1, or less than about 0.5, or less than about 0.1 wt % oxygen; and/or optionally less than about 20, or less than about 5 ppm sulfur. Any hydrotreatment referred to herein can be accomplished using either a batch or a continuous process.

The distillate mixture can comprise, consist of, or consist essentially of:

a) a first component, having a low temperature property, and selected from the group consisting of: a petroleum distillate, distillate range hydrocarbons produced by a Fischer-Tropsch process, and mixtures thereof; and b) a second component comprising the at least partially hydrotreated bio-distillate fraction described above.

Further, the distillate mixture has a low temperature property value which is lowered as compared to the low temperature property value of the first component.

In accordance with an embodiment of the invention, the first component can have a boiling point ranging from about 320 to about 700° F., or from about 330 to about 550° F., or from about 340 to about 700° F.

In accordance with an embodiment of the invention, the bio-oil can be at least partially hydrotreated to form an at least partially hydrotreated bio-oil. Such at least partially hydrotreated bio-oil can then at the least be fractionated into the at least partially hydrotreated bio-distillate fraction described above.

Such at least partially hydrotreated bio-distillate fraction can have a boiling point ranging from about 320 to about 700° F., or from about 330 to about 550° F., or from about 340 to about 700° F.

The second component can have a low temperature property value which is less than the low temperature property value of the first component, and the low temperature property can be selected from the group consisting of cloud point, pour point, cold flow plugging point, and low temperature flow test performance.

The at least partially hydrotreated bio-distillate fraction can have a cloud point below about −20° F., or below about −40° F., or below about −60° F.

When the low temperature property is the cloud point; the cloud point value of the distillate mixture is lower than that predicted by the below described cloud point prediction method for calculating the cloud point of a mixture of fuel components. The method is published in "Fundamentals of Petroleum Refining" by M. A. Fahim et. al, Chapter 9, Section 9.5 starting on page 244, and sets forth a cloud point mixture prediction equation for multiple distillate blendstock components as follows:

$$CP_{mixture} = (BI_{mixture})^{(1/0.05)}$$

wherein $CP_{mixture}$ is the predicted cloud point of the mixture in °K and the blend index (BI) of the mixture is the volume fraction weighted average of the BI of each component in the mixture, $BI_i$, and is calculated as follows:

$$BI_{mixture} = \Sigma_i (\text{Volume Fraction})_i \times BI_i,$$

and the BI of each component, i, is calculated as follows:

$$BI_i = (CP_i)^{0.05}$$

wherein $CP_i$ is the measured cloud point in °K of component i.

The distillate mixture has a measured cloud point suppression value which is equal to the difference between the cloud point of the first component and the cloud point of the distillate mixture. The measured cloud point suppression value can be at least 2 times greater than the cloud point suppression value predicted by the cloud point prediction method set out above.

The second component can be present in the distillate mixture in an amount of at least about 5 wt %, which can result in a lowering of the cloud point of such a distillate mixture by at least about 3° F., or at least about 4° F., or at least about 5° F.

The second component can also be present in the distillate mixture in an amount of at least about 10 wt %, which can result in a lowering of the cloud point of such a distillate mixture by at least about 5° F.

The second component can also be present in the distillate mixture in an amount of at least about 15 wt %, which can result in a lowering of the cloud point of such a distillate mixture by at least about 7° F.

In accordance with another embodiment of the invention, a bio-distillate composition, which has been at least partially hydrotreated and boils in the range of from about 320 to about 700° F., or from about 330 to about 550° F., or from about 340 to about 700° F. can comprise, consist of, or consist essentially of: a) at least about 40 wt %, or at least about 50 wt % cycloparaffins, and b) less than about 5, or less than about 2, or less than about 1 wt % n-paraffins and iso-paraffins.

Such bio-distillate composition can be used as at least a portion of the second component of the distillate mixture described above. Also, the bio-distillate composition can be obtained from any source capable of producing such a composition as described above, and including any one or more of the optional features of the bio-distillate composition disclosed below. More specifically, the bio-distillate composition can be obtained from the conversion of biomass and/or lipids by a conversion process including, but not limited to, thermo-catalytic, gasification, enzymatic, fast or slow pyrolysis, hydrothermal, liquefaction, transesterification, and fermentation to form alcohol which can be dehydrated and oligomerized, with or without isomerization.

The bio-distillate composition can also optionally further comprise less than about 1 wt % oxygen and/or optionally less than about 20 ppm sulfur.

The cycloparaffins of the bio-distillate composition can optionally be selected from the group consisting of mono-cycloparaffins, dicycloparaffins, and combinations thereof; and the monocycloparaffins can optionally be present in an amount of at least about 5, or at least about 7 wt %; and the dicycloparaffins can optionally be present in an amount of at least about 20, or at least about 25 wt %.

The cycloparaffins optionally present in the bio-distillate composition can comprise substituted and non-substituted 1-ring cyclohexanes and substituted and non-substituted 2-ring decalins. The substituted and non-substituted 1-ring cyclohexanes can optionally be present in the bio-distillate composition in an amount of at least about 5, or at least about 7 wt %; and the substituted and non-substituted 2-ring decalins can optionally be present in the bio-distillate composition in an amount of at least about 20, or at least about 25 wt %.

The bio-distillate composition can further optionally comprise 2-ring compounds in which one of the rings is aromatic and is selected from the group consisting of substituted and non-substituted tetralins, substituted and non-substituted indans, and combinations thereof; which can optionally be present in an amount of at least about 15, or at least about 20 wt %.

In accordance with another embodiment of the invention, a low temperature property value reducing composition can be produced from the thermo-catalytic conversion of a biomass, and further can be at least partially hydrotreated.

The low temperature property value reducing composition is capable of reducing a low temperature property value of a distillate component selected from the group consisting of: a petroleum distillate, distillate range hydrocarbons produced by a Fischer-Tropsch process, and mixtures thereof.

The low temperature property value reducing composition can comprise, consist of, or consist essentially of the bio-distillate fraction as described above.

The low temperature property value reducing composition can have a low temperature property value which is less than the low temperature property value of the distillate component.

In an embodiment wherein the low temperature property is the cloud point, the cloud point value of a distillate mixture, resulting from the addition of the low temperature property value reducing composition to the distillate component, is lower than that predicted by the cloud point prediction method for calculating the cloud point of a mixture of fuel components as set out above.

The cloud point suppression value, which is equal to the difference between the cloud point of the distillate component and the cloud point of the distillate mixture, is at least 2 times greater than the cloud point suppression value predicted by the cloud point prediction method.

A distillate mixture comprising the distillate component and at least about 5 wt % of the low temperature property value reducing composition, based on the total weight of the distillate mixture, can have a cloud point which is at least about 3, or at least about 4, or at least about 5° F. lower than the cloud point of the distillate component.

A distillate mixture comprising the distillate component and at least about 10 wt % of the low temperature property value reducing composition, based on the total weight of the distillate mixture, can have a cloud point which is at least about 5° F. lower than the cloud point of the distillate component.

Also, a distillate mixture comprising the distillate component and at least about 15 wt % of the low temperature property value reducing composition, based on the total weight of the distillate mixture, can have a cloud point which is at least about 7° F. lower than the cloud point of the distillate component.

EXAMPLES

In two separate runs, southern yellow pine wood chips were converted by thermo-catalytic conversion. The liquid products were separated from the gaseous products by condensation. Each of the resulting liquid products was further separated by gravity separation to form a bio-oil phase and an aqueous phase. The bio-oil phases were separately subjected to hydrotreatment wherein at least a portion of the oxygenated compounds were deoxygenated to form a first and a second hydrotreated bio-oil. A first bio-distillate fraction having a boiling point range of from around 330 to around 700° F. was separated from the first hydrotreated bio-oil. A second bio-distillate fraction having a boiling point range of from around 330 to around 550° F. (Jet fuel range) was also separated from the first hydrotreated bio-oil. A third bio-distillate fraction having a boiling point range of from around 330 to around 550° F. (Jet fuel range) was separated from the second hydrotreated bio-oil.

Samples of the first and second bio-distillate fractions, along with a sample of a petroleum-derived commercial JP-8 distillate jet fuel ("JP-8 (1)"), were analyzed using the ASTM D2425 mass spectrometry method, and the results of such testing are shown in Table 1 below.

TABLE 1

| Hydrocarbon Group-Type | 1st Bio-Distillate Fraction (330 to 700° F.) | 2nd Bio-Distillate Fraction (330 to 550° F.) | Commercial JP-8 (1) |
|---|---|---|---|
| D2425-MS | | | |
| Paraffins (normal and iso) | <1 | <1 | 49 |
| Cycloparaffins | 54 | 50 | 30 |
| Alkylbenzenes | 9 | 16 | 13 |
| Indans and Tetralins | 23 | 30 | 5.8 |
| Indenes and $C_nH_{2n-10}$, where n > 8 | 8 | 3.0 | 0.6 |
| Naphthalene | <0.3 | <0.3 | <0.3 |
| Naphthalenes | 3 | 1.2 | 1.0 |
| Acenaphthenes | 2 | <0.3 | <0.3 |
| Acenaphthylenes | <0.1 | <1 | <0.3 |
| Tricyclic Aromatics | <0.3 | <0.3 | <0.3 |
| Total | 100 | 100 | 100 |

Samples of the second bio-distillate fraction, the third bio-distillate fraction, commercial JP-8 (1), and other commercial JP-8 and Jet A distillate materials were also analyzed using two-dimensional gas chromatography (GC×GC), and results of such testing are shown in Table 2 below.

TABLE 2

| Hydrocarbon Group-Type | 2nd Bio-Distillate Fraction (330 to 550° F.) | 3rd Bio-Distillate Fraction (330 to 550° F.) | Commercial Fuels | | | |
|---|---|---|---|---|---|---|
| | | | Jet A (1) | Jet A (2) | JP-8 (1) | JP-8 (2) |
| GC × GC (mass %) | | | | | | |
| n-Paraffins | 0.2 | 0.1 | 25.1 | 10.1 | 18.8 | 5.4 |
| Iso-Paraffins | 0.4 | 0.3 | 32.8 | 20.6 | 31.7 | 13.4 |
| Monocycloparaffins | 15.8 | 16.6 | 18.7 | 32.4 | 20.6 | 42.8 |
| Dicycloparaffins | 31.2 | 31.4 | 3.3 | 10.7 | 5.7 | 20.2 |
| Tricycloparaffins | 6.5 | 3.4 | <1 | <1 | <1.0 | <1 |
| Alkylbenzenes | 17.0 | 14.5 | 16.9 | 14.7 | 17.4 | 11.0 |
| Indans and Tetralins | 26.8 | 31.8 | 2.9 | 9.4 | 4.1 | 7.0 |
| Naphthalene | 0.1 | 0.1 | 0.1 | 0.2 | 0.1 | <0.1 |
| Naphthalenes | 2.0 | 1.8 | 0.2 | 2.0 | 1.6 | 0.3 |
| Total | 100 | 100 | 100 | 100 | 100 | 100 |

The data in Tables 1 and 2 show that the inventive bio-distillate fractions have significantly higher cycloparaffin concentrations, significantly lower paraffin concentrations, and significantly higher combined concentrations of indans and tetralins as compared to the commercial JP-8 and Jet A materials.

Also, the data in Table 2 shows that the Jet Fuel range bio-distillates (second and third bio-distillate fractions) have significantly higher dicycloparaffin concentrations as compared to the commercial JP-8 and Jet A materials.

Cloud points were measured, using the ASTM D2500 method, for various mixtures of a petroleum distillate and the first bio-distillate fraction, and the results of such are presented in Table 3 below. Also, cloud points were predicted for the same mixtures using the cloud point prediction method described above, and such predictions are also presented in Table 3 below.

TABLE 3

| 1st Bio-distillate in Mixture | Cloud Point (° F.) | | Cloud Point Suppression | | Suppression Ratio |
|---|---|---|---|---|---|
| (wt %) | Predicted | Observed | Predicted | Observed | Obs.:Pred. |
| 0 | 3.20 | 3.2 | 0.0 | 0.0 | N/A |
| 5 | 2.04 | −2.2 | 1.2 | 5.4 | 4.5 |
| 10 | 0.82 | −4.0 | 2.4 | 7.2 | 3 |
| 15 | −0.46 | −5.8 | 3.7 | 9.0 | 2.4 |
| 100 | −77 | −77 | 0 | 0 | N/A |

As can be seen from the data in Table 3, the first bio-distillate fraction has an incredibly low cloud point, making it an excellent blendstock for distillate mixtures. As an added benefit, the data in Table 3 also shows that the addition of the inventive bio-distillate of the current invention to a petroleum distillate results in an unexpectedly lower cloud point for the mixture of the present invention than is predicted by the cloud point prediction method described above. In fact, the observed cloud point suppressions for the various mixtures were from about 2.4 to about 4.5 times the predicted cloud point suppression values, which reveals the novelty and inventiveness of the current invention.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

Further, unless expressly stated otherwise, the term "about" as used herein is intended to include and take into account variations due to manufacturing tolerances and/or variabilities in process control.

Combinations and sub-combinations may be made of the various components, elements, assemblies and/or ranges described herein without departing from the spirit and the scope of the invention as defined in the following claims. In addition, changes may be made in the construction and the operation of the various components, elements and assemblies described herein, and changes may be made in the steps or sequence of steps of the methods described herein without departing from the spirit and the scope of the invention as defined in the following claims.

That which is claimed is:

1. A distillate mixture comprising:
    a) a first component selected from the group consisting of: a petroleum distillate, distillate range hydrocarbons produced by a Fischer-Tropsch process, and mixtures thereof, said first component having a low temperature property value; and
    b) a second component comprising an at least partially hydrotreated bio-distillate fraction and containing at least about 20 wt. % 2-ring decalins produced from the conversion of cellulosic biomass at an elevated temperature; wherein said distillate mixture has a low temperature property value which is lowered as compared to the low temperature property value of said first component.

2. The distillate mixture of claim 1 wherein said conversion of said biomass further comprises the presence of a catalyst and wherein said elevated temperature is in the range of from about 200 to about 1000° C.

3. The distillate mixture of claim 1 wherein said at least partially hydrotreated biodistillate fraction comprises less than about 1 wt % oxygen.

4. The distillate mixture of claim 1 wherein said first component has a boiling point range of from about 320 to about 700° F., and said at least partially hydrotreated bio-distillate fraction has a boiling point range of from about 320 to about 700° F.

5. The distillate mixture of claim 4 wherein said first component has a boiling point range of from about 330 to about 550° F., and said at least partially hydrotreated biodistillate fraction has a boiling point range of from about 330 to about 550° F.

6. The distillate mixture of claim 1 wherein said at least partially hydrotreated biodistillate fraction has a cloud point below about −20° F.

7. The distillate mixture of claim 1 wherein said at least partially hydrotreated biodistillate fraction has a cloud point below about −40° F.

8. The distillate mixture of claim 1 wherein said at least partially hydrotreated biodistillate fraction has a cloud point below about −60° F.

9. The distillate mixture of claim 1 wherein the low temperature property is selected from the group consisting of cloud point, pour point, cold flow plugging point, and low temperature flow test performance.

10. The distillate mixture of claim 1 wherein the low temperature property is the cloud point; and wherein the cloud point value of said distillate mixture is lower than that predicted by the following:

$$CP_{mixture} = (BI_{mixture})^{(1/0.05)}$$

wherein $CP_{mixture}$ is the predicted cloud point of the mixture in ° K and the blend index (BI) of the mixture is the volume fraction weighted average of the BI of each component in the mixture, $BI_i$ $$BI_{mixture} = \Sigma_i (\text{Volume Fraction})_i \times BI_i,$$

and the BI of each component, i, is:

$$BI_i = (CP_i)^{0.05}$$

wherein $CP_i$ is the measured cloud point in ° K of component i.

11. The distillate mixture of claim 10 having a cloud point suppression value equal to the difference between the cloud point of said first component and the cloud point of said distillate mixture; wherein said cloud point suppression value is at least 2 times greater than the cloud point suppression value predicted by said cloud point prediction method.

12. The distillate mixture of claim 1 wherein said second component is present in an amount of at least about 5 wt %, and wherein the cloud point is lowered as compared to the cloud point value of said first component by at least about 3° F.

13. The distillate mixture of claim 12 wherein the cloud point is lowered as compared to the cloud point value of said first component by at least about 4° F.

14. The distillate mixture of claim 12 wherein the cloud point is lowered as compared to the cloud point value of said first component by at least about 5° F.

15. The distillate mixture of claim 1 wherein said second component is present in an amount of at least about 10 wt %, and wherein the cloud point is lowered as compared to the cloud point value of said first component by at least about 5° F.

16. The distillate mixture of claim 1 wherein said second component is present in an amount of at least about 15 wt %, and wherein the cloud point is lowered as compared to the cloud point value of said first component by at least about 7° F.

17. The distillate mixture of claim 1, wherein the second component has a boiling range of from about 320 to about 700° F. and comprises: a) at least about 40 wt % cycloparaffins, and b) less than about 5 wt % n-paraffins plus iso-paraffins.

18. The distillate mixture of claim 17 wherein the second component further comprises less than about 1 wt % oxygen and less than about 20 ppm sulfur.

19. The distillate mixture of claim 17 wherein the second component boils in the range of from about 330 to about 550° F.

20. The distillate mixture of claim 17 wherein said cycloparaffins are present in an amount of at least about 50 wt %, and said n-paraffins are present in an amount less than about 2 wt %.

21. The distillate mixture of claim 20 wherein said n-paraffins are present in an amount less than about 1 wt %.

22. The distillate mixture of claim 17 wherein said cycloparaffins are present in an amount of at least about 50 wt %, and said iso-paraffins are present in an amount less than about 2 wt %.

23. The distillate mixture of claim 22 wherein said iso-paraffins are present in an amount less than about 1 wt %.

24. The distillate mixture of claim 17 wherein said cycloparaffins are selected from the group consisting of monocycloparaffins, dicycloparaffins, and combinations thereof.

25. The distillate mixture of claim 24 wherein said monocycloparaffins are present in an amount of at least about 5 wt %.

26. The distillate mixture of claim 24 wherein said monocycloparaffins are present in an amount of at least about 7 wt %.

27. The distillate mixture of claim 24 wherein said dicycloparaffins are present in an amount of at least about 20 wt %.

28. The distillate mixture of claim 24 wherein said dicycloparaffins are present in an amount of at least about 25 wt %.

29. A bio-distillate composition boiling in the range of from about 320 to about 700° F. and comprising: a) at least about 40 wt % cycloparaffins wherein said cycloparaffins comprise substituted and non-substituted 1-ring cyclohexanes and substituted and non-substituted 2-ring decalins, and said substituted and non-substituted 1-ring cyclohexanes are present in said bio-distillate composition in an amount of at least about 5 wt %; and said substituted and non-substituted 2-ring decalins are present in said bio-distillate composition in an amount of at least about 20 wt %.

30. The bio-distillate composition of claim 29 wherein said substituted and nonsubstituted 1-ring cyclohexanes are present in said bio-distillate composition in an amount of at least about 7 wt %; and said substituted and non-substituted 2-ring decalins are present in said bio-distillate composition in an amount of at least about 25 wt %.

31. The bio-distillate composition of claim 29 wherein said bio-distillate composition boils in the range of from about 330 to about 550° F.

32. A bio-distillate composition boiling in the range of from about 320 to about 700° F. and comprising at least about 20 wt % 2-ring compounds selected from the group consisting of: substituted and non-substituted tetralins, substituted and non-substituted indans, and combinations thereof; wherein said biodistillate composition has been at least partially hydrotreated.

33. The bio-distillate composition of claim 32 wherein said 2-ring compounds are present in an amount of at least about 25 wt %.

34. The bio-distillate composition of claim 32 wherein said bio-distillate composition boils in the range of from about 330 to about 550° F.

35. A low temperature property value reducing composition comprising a bio-distillate fraction produced from the thermo-catalytic conversion of a cellulosic biomass, wherein said biodistillate fraction has been at least partially hydrotreated and contains at least 20 wt % of substituted and non-substituted tetralins, substituted and non-substituted indanes or a combination thereof;
and wherein said low temperature property value reducing composition is capable of reducing a low temperature property value of a distillate component selected from the group consisting of: a petroleum distillate, distillate range hydrocarbons produced by a Fischer-Tropsch process, and mixtures thereof.

36. The low temperature property value reducing composition of claim 35 wherein said low temperature property value reducing composition boils in the range of from about 320 to about 700° F.

37. The low temperature property value reducing composition of claim 35 wherein said low temperature property value reducing composition boils in the range of from about 330 to about 550° F.

38. The low temperature property value reducing composition of claim 35 wherein said low temperature property value reducing composition has a cloud point below about −20° F.

39. The low temperature property value reducing composition of claim 35 wherein said low temperature property value reducing composition has a cloud point below about −40° F.

40. The low temperature property value reducing composition of claim 35 wherein said low temperature property value reducing composition has a cloud point below about −60° F.

41. The low temperature property value reducing composition of claim 35 wherein the low temperature property is selected from the group consisting of cloud point, pour point, cold flow plugging point, and the low temperature flow test performance.

42. The low temperature property value reducing composition of claim 41 wherein the low temperature property is the cloud point; and wherein the cloud point value of a distillate mixture resulting from the addition of said low temperature property value reducing composition to said distillate component is lower than that predicted by the following:

$$CP_{mixture}=(BI_{mixture})^{(1/0.05)}$$

wherein $CP_{mixture}$ is the predicted cloud point of the mixture in °K and the blend index (BI) of the mixture is the volume fraction weighted average of the BI of each component in the mixture, $BI_i$:

$$BI_{mixture}=\Sigma_i(\text{Volume Fraction})_i \times BI_i,$$

and the BI of each component, i, is:

$$BI_i=(CP_i)^{0.05}$$

wherein $CP_i$ is the measured cloud point in K of component i.

43. The low temperature property value reducing composition of claim 42 wherein a cloud point suppression value is equal to the difference between the cloud point of said distillate component and the cloud point of said distillate mixture; and wherein said cloud point suppression value is at least 2 times greater than the cloud point suppression value predicted by said cloud point prediction method.

44. The low temperature property value reducing composition of claim 35 wherein a distillate mixture comprising said distillate component and at least about 5 wt % of said low temperature property value reducing composition, based on the total weight of said distillate mixture, has a cloud point which is at least about 3° F. lower than the cloud point of said distillate component.

45. The low temperature property value reducing composition of claim 35 wherein a distillate mixture comprising said distillate component and at least about 5 wt % of said low temperature property value reducing composition, based on the total weight of said distillate mixture, has a cloud point which is at least about 4° F. lower than the cloud point of said distillate component.

46. The low temperature property value reducing composition of claim 35 wherein a distillate mixture comprising said distillate component and at least about 5 wt % of said low temperature property value reducing composition, based on the total weight of said distillate mixture, has a cloud point which is at least about 5° F. lower than the cloud point of said distillate component.

47. The low temperature property value reducing composition of claim 35 wherein a distillate mixture comprising said distillate component and at least about 10 wt % of said low temperature property value reducing composition, based on the total weight of said distillate mixture, has a cloud point which is at least about 5° F. lower than the cloud point of said distillate component.

48. The low temperature property value reducing composition of claim 35 wherein a distillate mixture comprising said distillate component and at least about 15 wt % of said low temperature property value reducing composition, based on the total weight of said distillate mixture, has a cloud point which is at least about 7° F. lower than the cloud point of said distillate component.

* * * * *